Sept. 5, 1933.  G. W. CRIST  1,925,714
COMBINATION WRENCH AND ANVIL
Filed Jan. 8, 1931
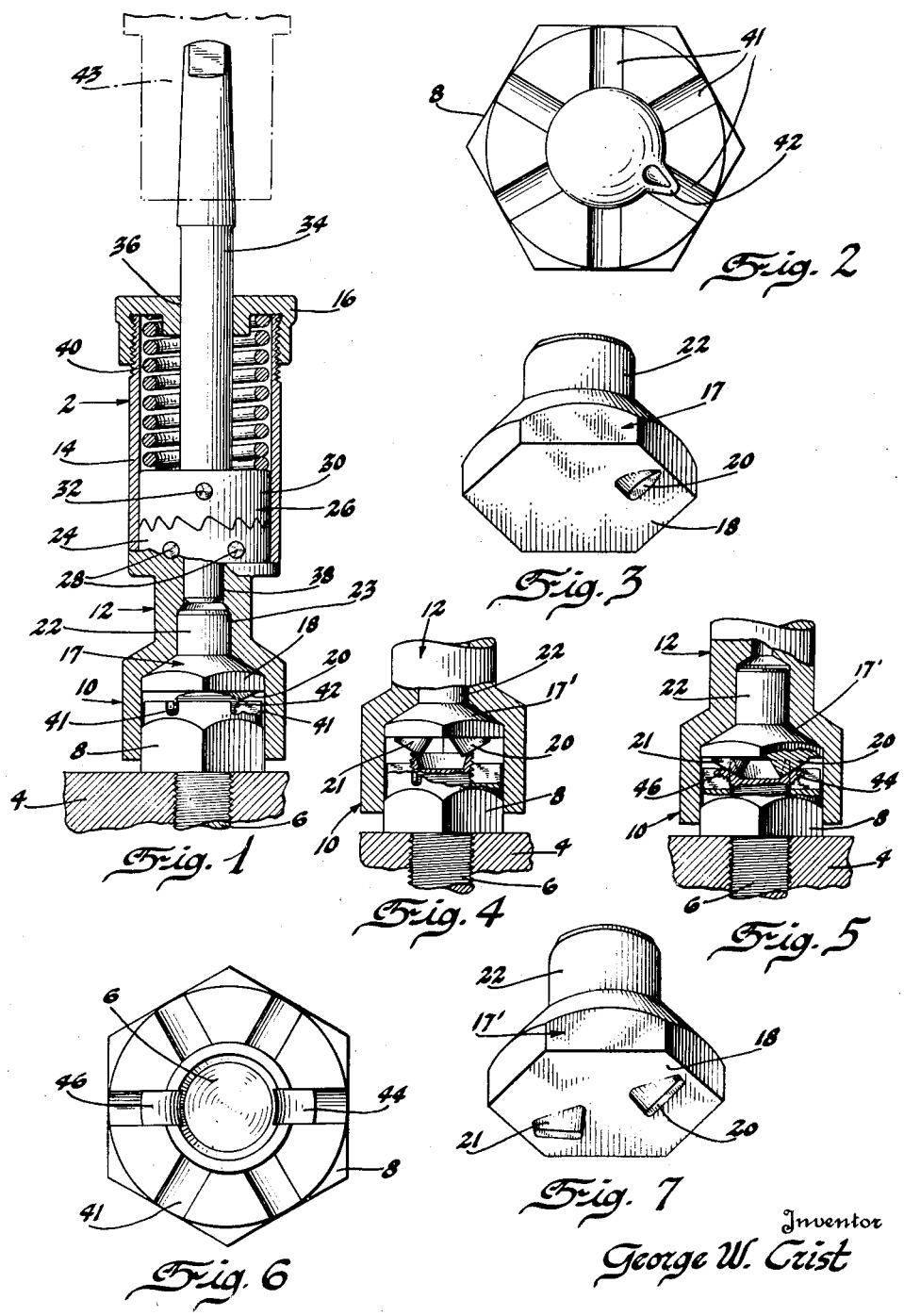
Inventor
George W. Crist
By Blackmore, Spencer & Fluit
Attorneys Patented Sept. 5, 1933

1,925,714

UNITED STATES PATENT OFFICE 1,925,714

COMBINATION WRENCH AND ANVIL

George W. Crist, Detroit, Mich.

Application January 8, 1931. Serial No. 507,364

16 Claim. (Cl. 81—10)

This invention relates to tools for tightening or screwing on the nuts of threaded shanks and combines therewith a means for locking the nut to the shank.

Various forms of lock nuts and lock washers are known and it is also old to use a cotter pin in connection with castellated nuts in which the cotter pin is passed through an opening in the bolt or shank and rests in the grooves of the castle. All this prior structure has involved considerable work and expense. In the case of the use of a cotter pin, these pins at times become broken and allow the nut to loosen.

The present invention aims to improve upon the devices of prior construction and to offer to the trade a tool which will screw a nut on its threaded shank and after the nut has been turned to the required degree of tightness the tool will operate to damage or peen over a portion of the shank into one of the grooves of the castellated nut to lock the nut and shank together to prevent the removal of the nut.

The tool or device of the invention comprises a socket having an interior shape which adapts it to fit over the nut. The shape will depend on the shape of the nut. In the bottom of the socket, there is mounted an anvil which has one or more projections on the face thereof extending toward the shank and nut. The socket portion has rigidly mounted thereon one member of a one-way clutch. The second member of the clutch is rigidly secured to a shaft which may be power or hand operated. The second member of the clutch is enclosed in a housing rigid with the socket and is spring pressed into engagement with the first clutch member. The shaft is mounted in bearings in the socket and housing. The spring of the clutch is of sufficient strength to normally cause the device to turn the nut but when a given degree of tightness is reached (such as will overcome the strength of the spring) the clutch will slip and produce a reciprocatory movement of the shaft and power operating means from and to the socket. This will cause the projections on the anvil to be pounded vigorously against the threaded end of the shank to damage or peen over a portion of the metal into one or more of the grooves of the castellated head. This portion of metal projecting into the grooves will prevent the nut from becoming loose on the shank.

On the drawing:

Figure 1 is a sectional view through the device of the invention.

Figure 2 is an enlarged plan view of a castellated nut and bolt showing a portion of the bolt damaged or peened into one of the grooves of the castle.

Figure 3 is a perspective view of the anvil of the invention.

Figure 4 is a detailed view showing the invention applied to a modified form of bolt end.

Figure 5 is a view of the structure of Figure 4 and a latter portion of the operation.

Figure 6 is an enlarged detailed view of the nut and peened-over portions of the bolt end of Figure 4.

Figure 7 is a perspective view of the anvil used in Figures 4 and 5.

Referring to the drawing, the numeral 2 indicates the device as a whole, and 4 indicates any piece of work which is to be held by means of a bolt or shank 6 and a nut 8. The device of the invention comprises the lower socket portion 10 the interior of which is shaped to receive a nut. In the disclosure on the drawing, the socket is hexagonal to receive the hexagonal nut 8. The socket 10 has the neck portion 12 connected thereto which is hollow and to which there is rigidly secured the cylindrical housing 14 closed at its top by means of the screw-threaded cap 16.

In the bottom of the socket 10 there is rigidly mounted the anvil 17 which has the shape shown in Figure 3. The head 18 of the anvil is hexagonal shape and has a projection 20 extending from the face thereof and projecting toward the shank 6 and castellated nut 8 when the tool 2 is in position. The anvil also has the stud portion 22 which is received in the bore 23 of the neck portion 12. The anvil 16 is rigidly and permanently mounted in the end of the socket as shown in Figure 1.

Rigidly mounted at the lower portion of the housing 14 is one half 24 of a one-way clutch indicated as a whole at 26. The clutch half 24 is secured to the housing 14 by means of the pins 28. The other half 30 of the clutch is secured by means of a pin 32 to the drive shaft 34 extending through an opening 36 in the cap 16, through both clutch members, and into a reduced bored portion 38 of the neck 12. The clutch half 30 is provided with suitable teeth which engage corresponding teeth on the clutch half 24 and the two are normally held in engagement by means of the coil spring 40 held between the clutch half 30 and cap 16 in the housing 14. The clutch half 30 is freely rotatable with reference to the housing 14.

The projection 20 from the face 18 of the anvil is so positioned that it will always mate with or conform to one of the recesses 41 of the castellated nut 8.

The operation of the device is as follows: A nut 8 is placed in the socket 10 and the tool and nut then applied to the threaded shank 6. The electric or air motor (indicated diagrammatically at 43) on the end of the shaft 34 is then started which will cause the device to screw the nut 8 on the shank 6 until it strikes the part 4. The turning operation will be continued until the nut has received a degree of tightness equivalent to the strength of the spring 40. The continued operation of the motor will then cause the clutch to slip to prevent injury to the threads but will reciprocate the shaft 34 and parts associated therewith owing to the engagement and disengagement of the teeth of the clutch. This will cause a pounding action on the anvil 16 acting on the end of the shank 6 and cause a portion thereof as indicated at 42 to be peened over or upset and wedged into the recess 41 of the castellated nut 8 by the projection 20. The tool is now withdrawn leaving the nut 8 in position and locked by means of the peened-over or upset portion 42.

Inasmuch as the peened-over or upset portion 42 is not of a very large size, the nut 8 may be removed by the application of a wrench and applying sufficient force thereto to break off the peened-over portion 42.

In the structure of Figures 4 to 7, inclusive, the invention is shown adapted to a different type of bolt end. In the bolt or shank end of Figure 1, the end is rounded or convex while in Figures 4 to 7, inclusive, it is hollow or counterbored. In the species of these figures, the anvil 17' is provided with two projections 20 and 21 which peen over or upset two portions of the edge of the hollow or counterbored end of the bolt as shown at 44 and 46 to interlock the nut and bolt.

Where no air or electric motor 43 is used and the device is hand operated, a hammer or mallet is used and the end of the shaft 34—or a cap placed thereover—is pounded to cause the projection 20 to peen over the metal 42.

I claim:

1. In a device of the class described for screwing a nut on a threaded shank, a socket adapted to fit over the nut and to turn the same on the shank, a one-way clutch to prevent further turning of the nut after it has been tightened on the shank, and means acting on the shank after the nut has been tightened for damaging a portion of the shank to interlock the nut and shank to prevent the former from becoming loose.

2. In a device of the class described for screwing a nut on a threaded shank, a socket adapted to fit over the nut and to turn the same on the shank, means to allow a relative intermovement of the parts of the device to prevent further turning of the nut after it has been tightened on the shank, and a projection acting on the shank after the nut has been tightened to damage a portion of the shank to interlock the nut and shank to prevent the former from becoming loose.

3. In a device of the class described for screwing a castellated nut on a threaded shank, a socket adapted to fit over the nut and to turn the same on the shank, a one-way clutch to allow a relative intermovement of the parts of the device to prevent further turning of the nut after it has been tightened on the shank, and a projection mating with one or more of the recesses of the castellated nut and acting on the shank after the nut has been tightened, to damage a portion of the shank and cause the metal of the portion to project into the recess of the nut to lock the shank and nut to prevent the latter from becoming loose.

4. In a device of the class described for screwing a nut on a threaded shank, a socket adapted to fit over the nut and to turn the same on the shank, a one-way clutch to allow a relative intermovement of the parts of the device to prevent further turning of the nut after it has been tightened on the shank, said clutch adapted to cause a reciprocation of parts of the device after the nut is tightened, and means acting on the shank by the reciprocating movement to damage a portion of the shank to interlock said shank and nut to prevent the latter from becoming loose.

5. In a device of the class described for screwing a nut on a threaded shank, a socket adapted to fit over the nut and to turn the same on the shank, means to prevent turning of the socket and to cause a reciprocation of a part of the device after the nut has been tightened, an anvil mounted in the socket, and a projection on the anvil actuated by the reciprocating movement to damage a portion of the shank to thereby interlock the shank and nut to prevent the latter from becoming loose.

6. In a device of the class described for screwing a castellated nut on a threaded shank, a socket adapted to fit over the nut and to turn the same on the shank, means to allow a relative intermovement of the parts of the device to prevent turning of the socket and to cause a reciprocation of a part of the device after the nut has been tightened, an anvil mounted in the socket, and a projection on the anvil mating with a recessed portion of the castellated nut and actuated by the reciprocating movement to damage a portion of the shank to thereby interlock the shank and nut to prevent the latter from becoming loose.

7. In a device of the class described, cooperating rotatable relatively movable members having interengaging parts to cause one to be driven by the other, one of said members having a part shaped to fit over a nut for screwing the nut on a threaded bolt when the members are rotated and being held rotationally stationary when the nut is tightened, and means on the device operative upon the continued rotation of the other of said members to lock the nut on the bolt.

8. In a device of the class described, cooperating rotatable relatively movable members having interengaging parts to cause one to be driven by the other, one of said members having a part shaped to fit over a nut for screwing the nut on a threaded bolt when the members are rotated and being held rotationally stationary when the nut is tightened, and means on the device and acting on the bolt and operative upon the continued rotation of the other of said members to lock the nut on the bolt.

9. In a device of the class described, cooperating rotatable relatively movable members having interengaging parts to cause one member to be driven by the other, one of said members having a part shaped to fit over a nut for screwing the nut on a threaded bolt when the members are rotated and being held rotationally stationary when the nut is tightened, and means on the device and acting on the bolt and operative upon the continued rotation of the other of said members to damage a portion of the bolt to interlock the nut and bolt.

10. In a device of he class described, cooperating rotating relatively movable members having interengaging parts to cause one member to be driven by the other, said members being relatively rotatable, one of said members having a part shaped to fit over a nut for screwing the nut on a threaded bolt when the members are rotated and being held rotationally stationary when the nut is tightened, and a projection on the member having the nut fitting part, said projection acting on the bolt and operative on the continued rotation of the other of said members to damage a portion of the bolt to interlock the nut and bolt.

11. In a device for screwing a castellated nut on a threaded bolt, comprising cooperating rotatable members having interengaging parts to cause one to be driven by the other, the interengagement of said parts permitting one member to rotate relative to the other, a socket on one of said members adapted to fit over the nut to screw the nut on the bolt upon rotation of the members, said member having the socket being held rotationally stationary when the nut is tightened, and a projection on said socketed member aligned with one of the spaces of the castellated nut, the continued rotation of the driving member causing a breaking of the driving interengagement between said members to give a reciprocating movement to one of said members to cause said projection to wedge a portion of the bolt into the space of the castellated nut to lock the nut on the bolt.

12. In a device of the class described, rotatable means including a socket adapted to fit over the nut, and means acting during the rotation of said means and after the nut has been tightened to lock the nut to the bolt.

13. In a device of the class described, cooperating rotatable relatively movable members having interengaging parts to cause one to be driven by the other, a socket on one of said members adapted to fit over a nut to turn the same on a threaded bolt when the members are rotated, said member having the socket being held rotationally stationary after the nut has been tightened while the other member continues to rotate, said continued rotation causing a slipping of the interengaging parts to give a reciprocating movement to a part of the device, and an anvil mounted in said socket and receiving a pounding action from said reciprocating part to damage the bolt to thereby interlock the bolt and nut.

14. In a device of the class described, cooperating rotatable relatively movable members having parts forming an interconnection to cause one member to be driven by the other, a socket on one of the members adapted to fit over a nut to screw the nut on a bolt when the device is rotated, said socket being held rotationally stationary when the nut is tightened, the driving members continuing to rotate after the socket has stopped to cause the interconnection to slip to cause a reciprocation of a part of the device, an anvil mounted in the socket receiving a pounding action from the reciprocating part, and means on the anvil to damage a portion of the bolt to thereby interlock the nut and bolt.

15. In a device of the class described, cooperating rotatable relatively movable members having parts forming an interconnection to cause one member to be driven by the other, a socket on said driven member adapted to fit over a castellated nut to screw the nut on a threaded bolt, said driven member being held rotationally stationary when the nut is tightened, the stopping of said driven member causing a slipping of the connection to impart a reciprocating motion to the driving member, an anvil mounted in said socket, the reciprocating motion of said driving member exerting a pounding action on said driven member and anvil, and means on said anvil mating with a space of the castellated nut to damage the bolt to lock the nut.

16. In a device of the class described, cooperating rotatable relatively movable members having parts forming an interconnection to cause one member to be driven by the other, a socket on said driven member adapted to fit over a castellated nut to screw the nut on a threaded bolt, said driven member being held rotationally stationary when the nut is tightened, the stopping of said driven member causing a slipping of the connection to impart a reciprocating motion to the driving member, an anvil mounted in said socket, the reciprocating motion of said driving member exerting a pounding action on said driven member and anvil, and a plurality of projections on said anvil mating with a space of the castellated nut to damage the bolt to lock the nut.

GEO. W. CRIST.